United States Patent
Woltman et al.

(10) Patent No.: US 9,104,038 B2
(45) Date of Patent: Aug. 11, 2015

(54) MULTIPLE LASER DRIVE METHOD, APPARATUS AND SYSTEM

(71) Applicant: Microvision, Inc., Redmond, WA (US)

(72) Inventors: Scott Woltman, Lynnwood, WA (US); Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 370 days.

(21) Appl. No.: 13/870,169

(22) Filed: Apr. 25, 2013

(65) Prior Publication Data

US 2014/0320829 A1 Oct. 30, 2014

(51) Int. Cl.
*H04N 9/31* (2006.01)
*G02B 26/10* (2006.01)
*G03B 21/20* (2006.01)
*G02B 27/48* (2006.01)
*G03B 33/06* (2006.01)

(52) U.S. Cl.
CPC ............ *G02B 27/48* (2013.01); *G03B 21/2013* (2013.01); *G03B 21/2033* (2013.01); *G03B 33/06* (2013.01); *H04N 9/3185* (2013.01); *G03B 21/2053* (2013.01); *H04N 9/31* (2013.01); *H04N 9/3105* (2013.01); *H04N 9/3164* (2013.01)

(58) Field of Classification Search
USPC .......... 353/31, 37, 85, 94, 98, 99; 359/204.1, 359/204.4; 362/553, 227, 230, 231, 234
See application file for complete search history.

(56) References Cited

U.S. PATENT DOCUMENTS

| | | | | |
|---|---|---|---|---|
| 7,159,987 B2 * | 1/2007 | Sakata | ............................. | 353/31 |
| 7,931,378 B2 * | 4/2011 | Sagawa | ........................... | 353/94 |
| 7,959,297 B2 * | 6/2011 | Silverstein et al. | ............ | 353/31 |
| 8,591,040 B2 * | 11/2013 | Young et al. | .................... | 353/84 |
| 2008/0291672 A1 * | 11/2008 | Hsu et al. | ...................... | 362/231 |
| 2009/0073687 A1 * | 3/2009 | Kiser | ............................. | 362/231 |
| 2011/0242494 A1 | 10/2011 | Imai et al. | | |
| 2012/0140784 A1 | 6/2012 | Quirk et al. | | |
| 2014/0009692 A1 * | 1/2014 | Sato | ............................. | 348/760 |

FOREIGN PATENT DOCUMENTS

JP 2006-018327 1/2006
KR 10-2007-0047983 5/2007

OTHER PUBLICATIONS

Microvision Inc., , "International Search Report and Written Opinion", ISR and Written Opinion for PCT/US2014/032517, Aug. 8, 2014.

* cited by examiner

*Primary Examiner* — William C Dowling
(74) *Attorney, Agent, or Firm* — Kevin D. Wills (57) ABSTRACT

A scanning projector includes a scanning mirror that sweep a beam in two dimensions. The beam is created by multiple laser light sources, at least two of which create light at substantially the same wavelength. A first of the two light sources is driven up to a transition point past which both of the two light sources are driven (equally or unequally).

20 Claims, 11 Drawing Sheets

*BALANCED LASER LIGHT SOURCE DRIVE*

*FIG. 3*

*POWER OPTIMIZED LASER LIGHT SOURCE DRIVE*

HYBRID LASER LIGHT
SOURCE DRIVE WITH
THREE LASER LIGHT
SOURCES

MULTIPLE LASER DRIVE METHOD, APPARATUS AND SYSTEM

FIELD

The present invention relates generally to projection systems, and more specifically to scanning projection systems.

BACKGROUND

Laser light reflected off a surface sometimes exhibits a sparkling phenomenon referred to as "speckle." Laser light is spatially coherent, and when reflected off a diffuse surface, the reflected coherent light waves interfere with each other in a regular pattern that results in a user perceiving speckle. Scanning projectors that utilize lasers for light sources may exhibit speckle across a displayed image.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
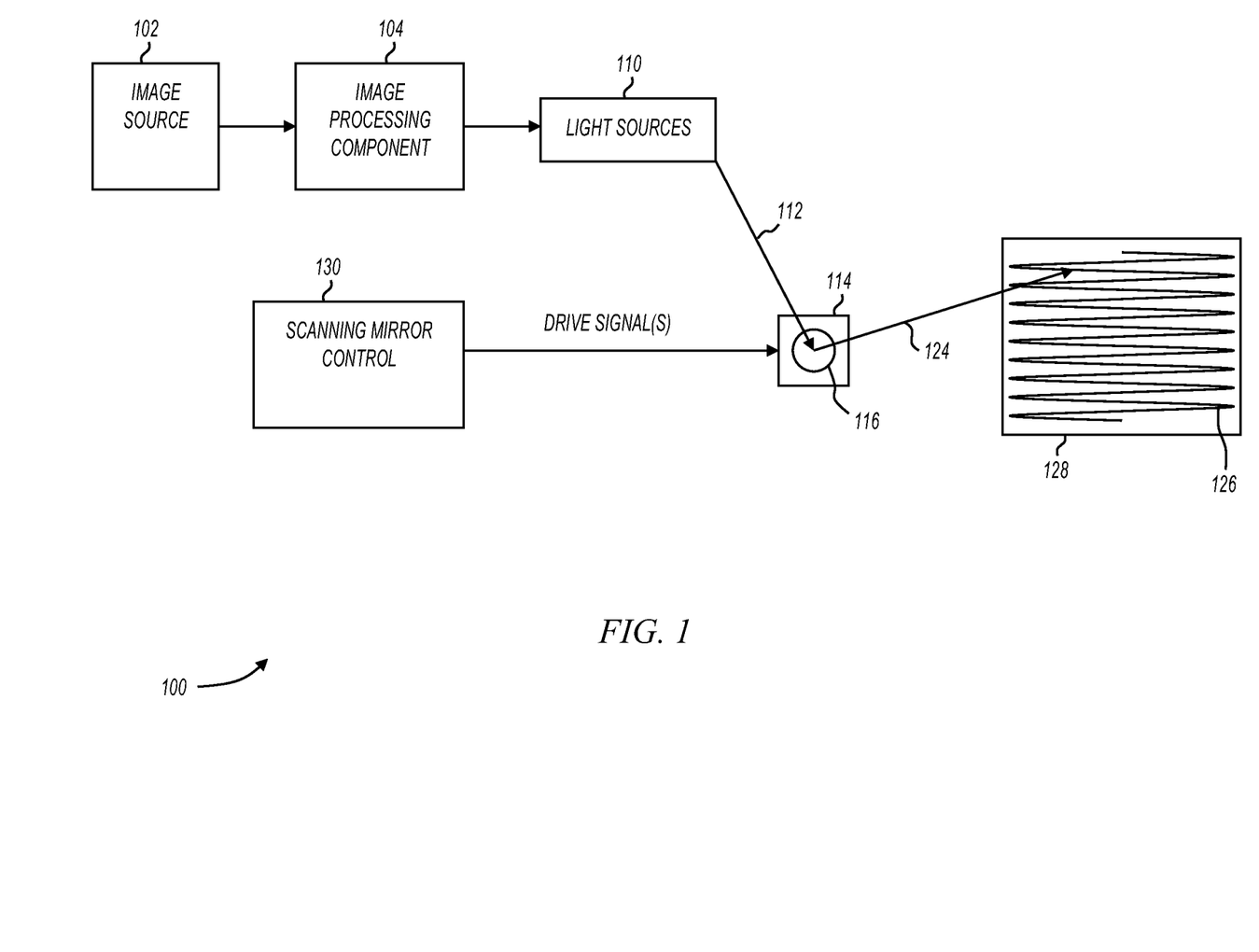
FIG. 1 shows a scanning projection apparatus in accordance with various embodiments of the present invention.

FIG. 1 shows a scanning projection apparatus in accordance with various embodiments of the present invention. As shown in FIG. 1, scanned beam projection system 100 includes a light source 110 that includes multiple laser light sources capable of emitting a beam 112. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

One raster scan from top-to-bottom is referred to herein as one "frame." Pixels are painted along the raster scan in a frame as light sources 110 are modulated. Although the fast-scan axis is shown as the horizontal axis, and the slow-scan axis is shown as the vertical axis, the various embodiments of the present invention are not so limited. In some embodiments, the slow-scan axis is the horizontal axis and the fast scan axis is the vertical axis.

Image source 102 provides an image to be displayed to image processing component 104. Image source 102 may include a processor executing software or any type of hardware that can provide an image. For example, image source 102 may be a storage medium such as a memory device or a hard disk. Also for example, image source 102 may be a processor that forms an image while executing software instructions. In still further examples, image source 102 may be a connector or a communication medium that can receive communications that include an image to be displayed. The image provided to image processing component 104 may be static or may change over time. For example, the image source 102 may provide a video stream to image processing component 104.

Image processing component 104 receives an image from image source 102 and drives the laser light sources 110 with the correct timing and intensity so as to reproduce the image as beam 124 traverses raster pattern 126. In some embodiments, image processing component 104 drives multiple laser light sources that produce light of substantially the same wavelength. For example, laser light sources 110 may include two sources of green laser light, and image processing component 104 may drive them both to produce one pixel. Both green laser light sources may be driven equally or unequally and/or may be time multiplexed.

Using multiple sources of laser light of substantially the same wavelength can increase the available output power and also reduce speckle. When multiple sources of laser light of the same wavelength are driven at the same output power level, speckle is reduced by a factor of up to $$\frac{1}{\sqrt{n}},$$

where n is the number of laser light sources. The actual magnitude of speckle reduction depends on a number of factors. Various embodiments of the present invention use multiple sources of laser light capable of being driven one at a time or simultaneously.

Various embodiments of the scanned beam projection system 100 include a hybrid laser source drive as described in more detail below. For example, in some embodiments, only one laser light source is driven at low output light power levels to reduce power consumption, and multiple laser light sources are driven at higher output light power levels to reduce speckle. The output power level above which multiple laser light sources are driven is referred to herein as a "transition output light level." The transition output light level may be static or dynamic, and may be determined using many different factors as described in more detail below. In some embodiments, the transition output light level is below the peak power available from one laser light source alone.

Figure 2:
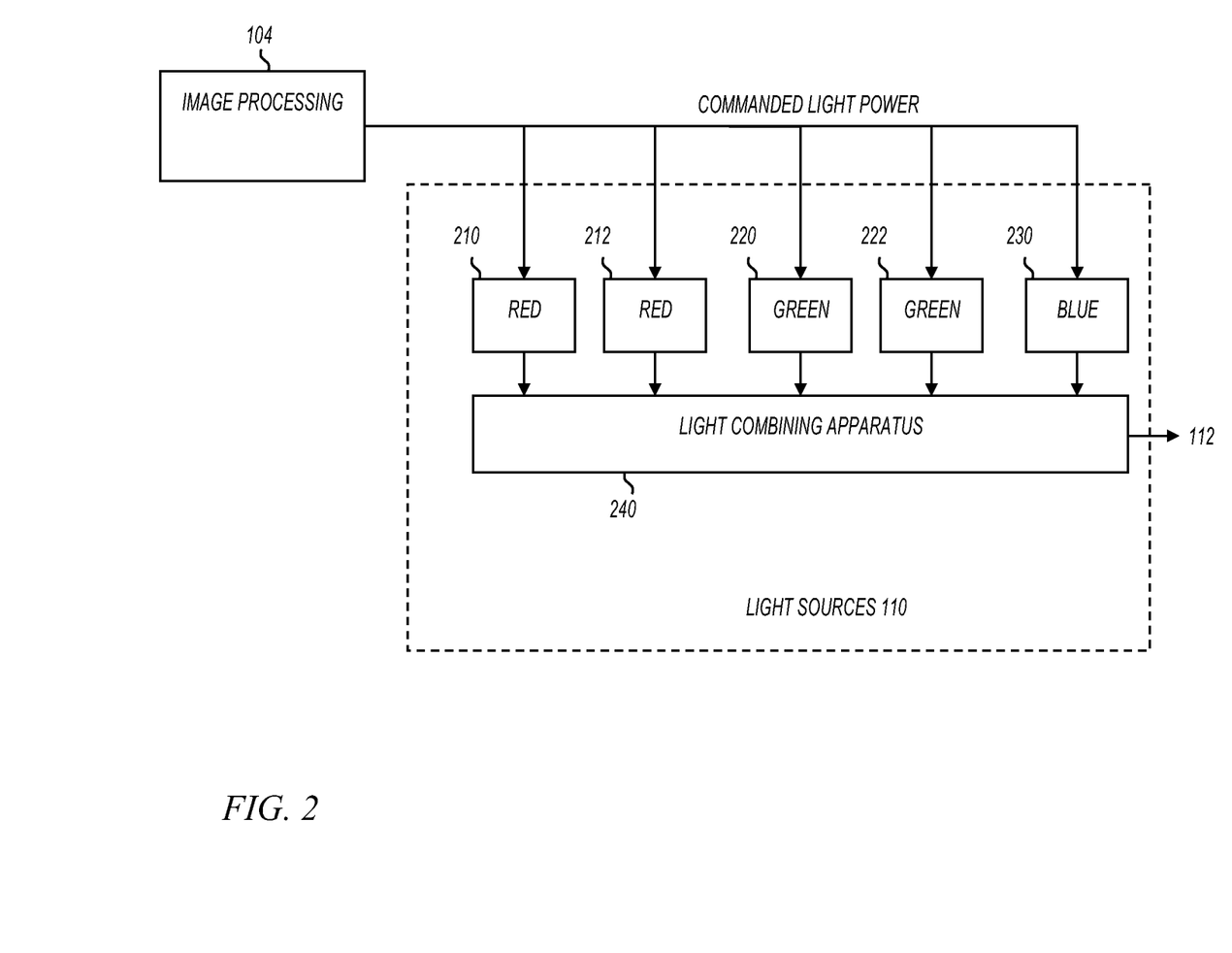
FIG. 2 shows multiple laser light sources that produce light of substantially the same wavelength.

FIG. 2 shows multiple laser light sources that produce light of substantially the same wavelength. As shown in FIG. 2, light sources 110 includes two red light sources 210, 212, two green light sources 220, 222, and one blue light source 230. Each of the light sources 210, 212, 220, 222, and 230 are driven with commanded luminance values by image processing component 104, and produce light in response thereto. For example, red light sources 210 and 212 produce red laser light in response to commanded luminance values received from image processing component 104.

As used herein, the term "light of substantially the same wavelength" refers to light that is perceived to be the same color by a human eye. For example, green laser light sources 220 and 222 produce light of substantially the same wavelength. In some embodiments they may produce light of exactly the same wavelength (e.g., 525 nanometers) and in other embodiments, the wavelength of the light from the two source may vary while still being in the "green" spectrum (e.g., 520-550 nanometers). In both cases, the two sources produce light of substantially the same wavelength.

In operation, image processing component 104 produces commanded luminance values to drive the laser light sources when pixels are to be displayed. Image processing component 104 may include any suitable hardware and/or software useful to produce commanded drive values from video data. For example, image processing component 104 may include application specific integrated circuits (ASICs), one or more processors, or the like. In some embodiments, image processing component 104 determines the location of beam 124, and interpolates between pixels in a source image to determine luminance values for a pixel to be displayed on the raster pattern 126.

Image processing component 104 drives the multiple light sources in a manner that reduces power consumption and/or decreases speckle. For example, in some embodiments, one of two light sources of substantially the same wavelength is driven up to a transition output light level, and both of the two light sources of substantially the same wavelength are driven when the commanded output light level is above the transition output light level. For example, if for a given pixel, the green commanded light power is below the green transition output light level, then only green light source 220 may be driven. Also for example, when the green commanded light power is above the transition output light level, then both green light sources 220 and 222 may be driven. They may be driven with equal power levels or different power levels. When driven with equal power levels, speckle can be reduced by up to 0.707

$$(\frac{1}{\sqrt{n}}$$

with n=2), and when driven with unequal power levels, efficiency may be increased. Further, in some embodiments, the single green laser light source used for low commanded light powers may be alternated from one frame to the next, or may be alternated over time. Alternating laser light sources "levels" the wear and aging of the light sources and further may reduce apparent speckle because the human eye averages information received over multiple frames.

In some embodiments, the laser light sources include laser diodes that are driven with electrical current. In these embodiments, the commanded light power values may be electrical currents. Further, in some embodiments, the light sources include digital-to-analog converters that receive digital commanded light power values and drive laser diodes.

Light combining apparatus 240 receives light from the various light sources shown and creates a single collimated beam at 112. Light combining apparatus 240 may include any suitable optical components, such as mirrors and lenses.

Laser light sources 110 shows two red light sources, two green light sources, and one blue light source, although this is not a limitation of the present invention. For example, in some embodiments, light sources 110 includes two green light sources, and one each of red and blue light sources. In other embodiments, light sources 110 includes only two red or only two blue light sources.

Figure 3:
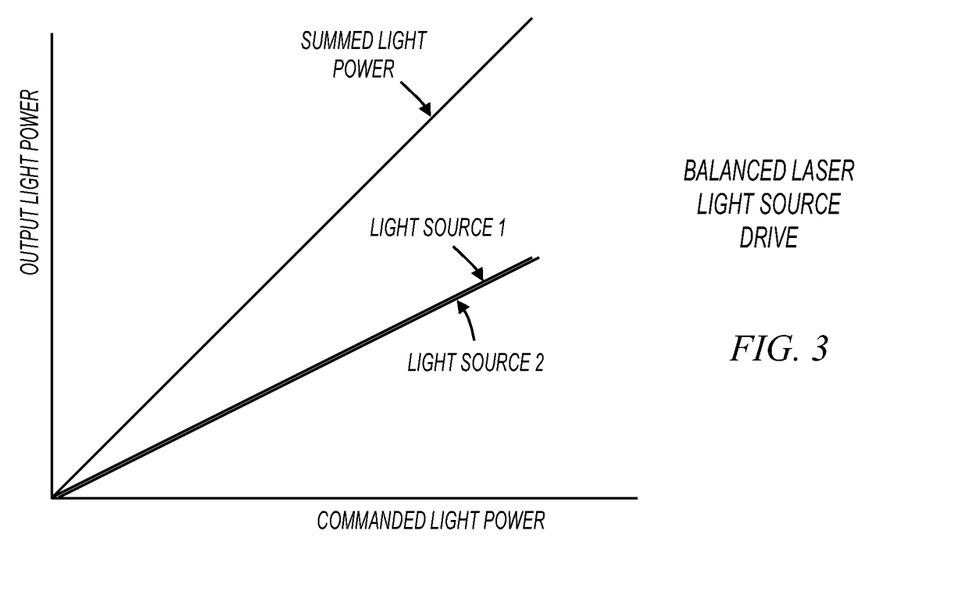
FIG. 3 shows a plot of output light power for a balanced laser light source drive.

FIG. 3 shows a plot of output light power for a balanced laser light source drive. Plot 300 shows output light power as a function of commanded light power for each of two light sources. Plot 300 also shows the summed light power. In the example of FIG. 3, light source 1 and light source 2 are light sources that emit light of substantially the same wavelength. For example, light source 1 may be green light source 220, and light source 2 may be green light source 222. In this example, the summed light power is the total light emitted by green light sources 220 and 222.

In some embodiments, light sources 1 and 2 are laser diodes that require a minimum current (referred to herein as a "threshold current") to meet the diode's threshold, and only current above the threshold current contributes to light production. Accordingly, driving two laser diodes equally for any given output light power as shown in FIG. 3 results in higher power consumption than does driving a single laser diode to produce the same amount of output light power.

As shown in FIG. 3, light sources 1 and 2 are driven equally for every commanded light power value. This provides speckle reduction at the expense of increased power.

Figure 4:
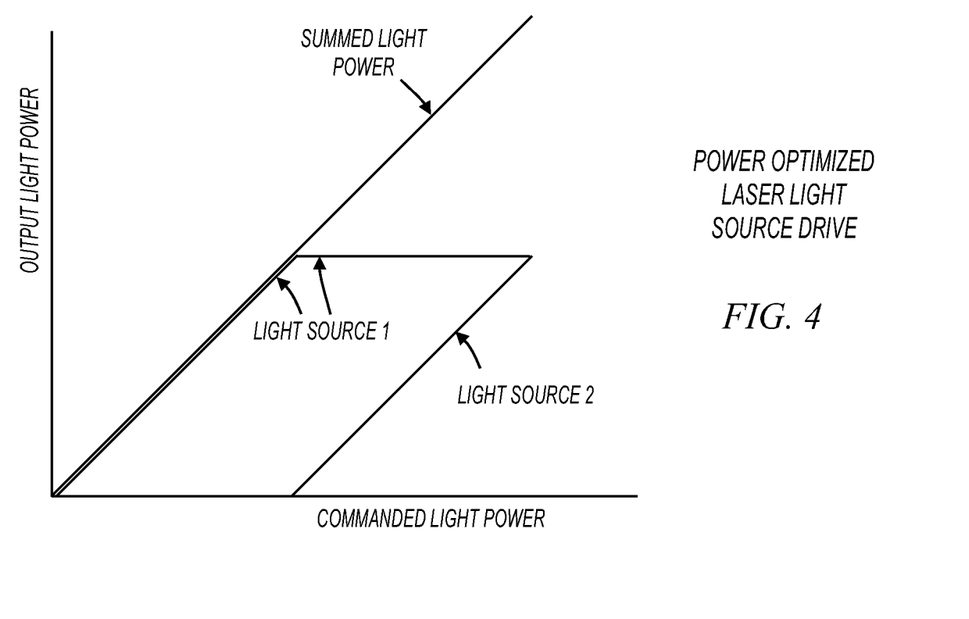
FIG. 4 shows a plot of output light power for a power optimized laser light source drive.

FIG. 4 shows a plot of output light power for a power optimized laser light source drive. The summed light power as a function of commanded light power shown in FIG. 4 is identical to the summed light power as a function of commanded light power shown in FIG. 3; however, the relative contributions of light source 1 and light source 2 are different. In the example of FIG. 3, light source 1 is driven to peak output light power as the commanded light power increases, and then light source 2 is driven along with light source 1 for higher commanded light powers.

As shown in FIG. 4, only one light source is driven for low commanded light power levels, and two light sources are driven when the commanded light power level exceeds the capability of one light source alone. This provides power savings at low commanded light power levels at the expense of increased speckle.

Figure 5:
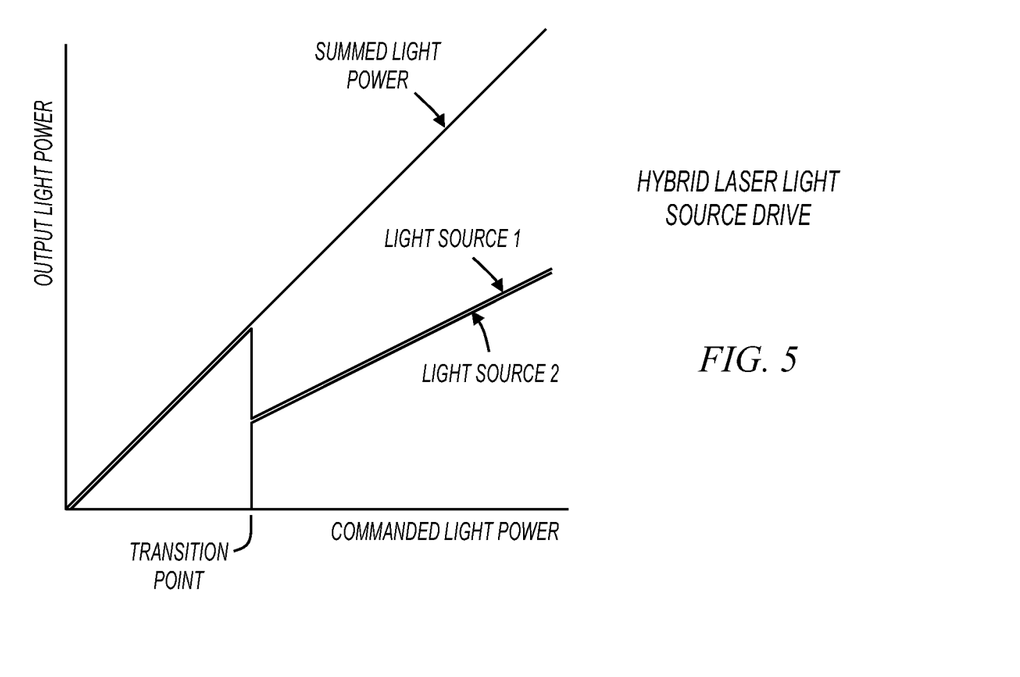
FIG. 5 shows a plot of output light power for hybrid laser light source drive.

FIG. 5 shows a plot of output light power for hybrid laser light source drive. The summed light power as a function of commanded light power shown in FIG. 5 is identical to the summed light powers shown in FIGS. 3 and 4; however, the relative contributions of light source 1 and light source 2 are different. In the example of FIG. 5, light source 1 is driven for low commanded light power levels up to a transition point (also referred to as a "transition output light level"), and both light source 1 and light source 2 are driven equally for commanded light power levels above the transition point. In some embodiments, light source 1 is driven for low commanded light power levels up to the transition point, and both light source 1 and light source 2 are driven unequally for commanded light power levels above the transition point.

The laser drive shown in FIG. 5 is referred to as "hybrid" in part because only one laser light source is driven below the transition point, and both light sources are driven equally or unequally above the transition point, where the transition point is less than the peak power available from the first laser light source.

The first and second light sources referred to in FIG. 5 may correspond to sources of light at any wavelength. For example, the first light source may be red light source 210 and the second light source may be red light source 212. Also for example, the first light source may be green light source 220 and the second light source may be green light source 222.

In some embodiments, the roles of the first and second laser light sources are swapped for alternate frames. For example, the first laser light source may be driven up to the transition point for all pixels in one frame, and then the second laser light source may be driven up to the transition point the next frame. This may occur for laser diodes of substantially the same wavelength, or for all laser diodes in a projection apparatus.

Figure 6:
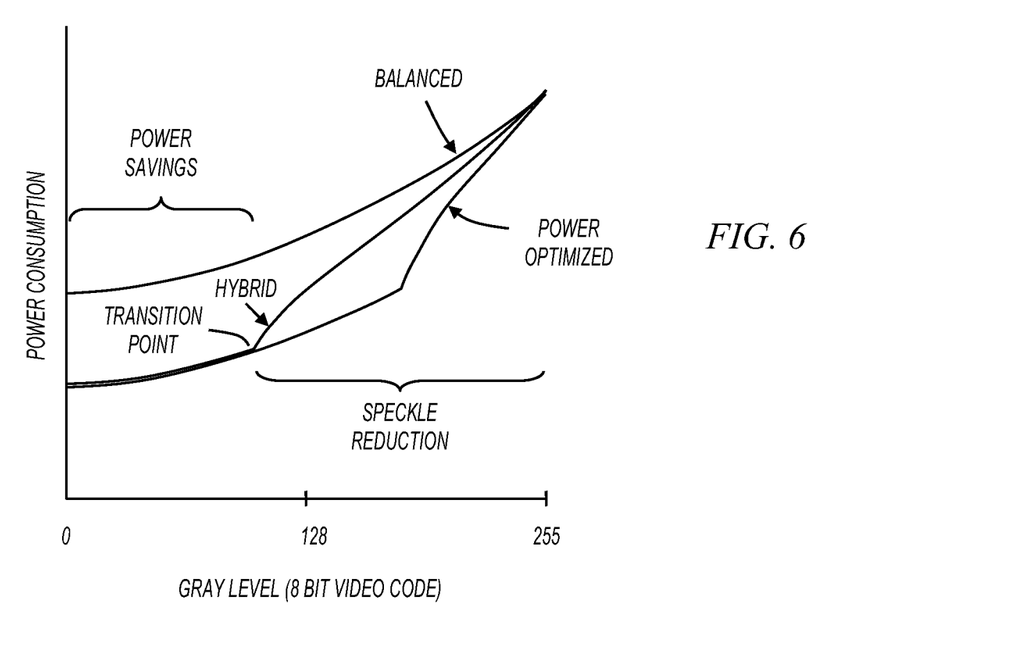
FIG. 6 shows a plot comparing power consumption for balanced, power optimized, and hybrid laser light source drives.

FIG. 6 shows a plot comparing power consumption of a frame for balanced, power optimized, and hybrid laser light source drives. The power optimized curve represents power consumption as a function of commanded light power for the power optimized drive case shown in FIG. 4. The balanced curve represents power consumption as a function of commanded light power for the balanced drive case shown in FIG. 3. The hybrid curve represents power consumption as a function of commanded light power for the hybrid drive case shown in FIG. 5.

As shown in FIG. 6, the hybrid laser light source drive realizes power savings over the balanced drive for commanded light power levels below the transition point, and realizes speckle reduction over the power optimized drive for commanded light power levels above the transition point.

Figure 7:
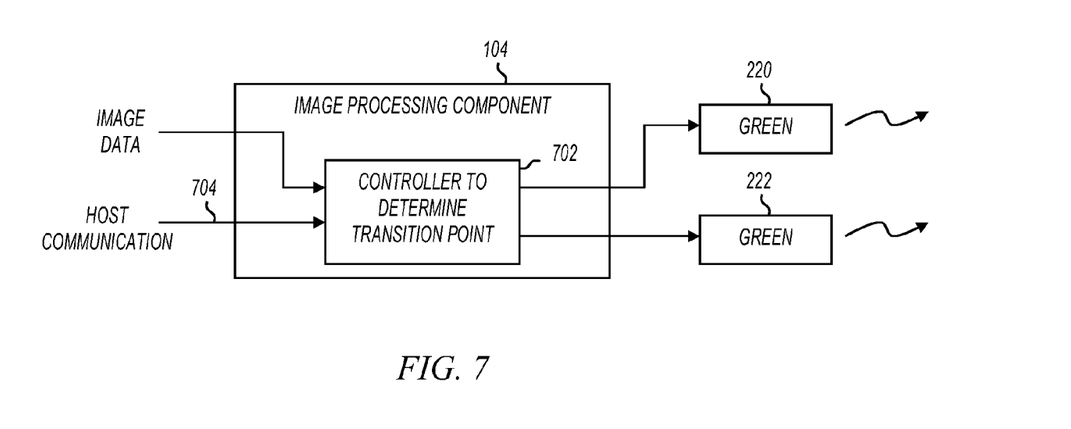
FIG. 7 shows an image processing component in accordance with various embodiments of the present invention.

FIG. 7 shows an image processing component in accordance with various embodiments of the present invention. Image processing component 104 includes a controller 702. Controller 702 is configured to determine the value for the transition output light level as shown above in FIG. 6. For example, in some embodiments, controller 702 receives image data and determines the transition output light level based on characteristics of the image data. In some embodiments, the transition output light level is determined based on average image light intensity over one or more lines or frames. When average light intensity is low, the transition output light level may be set relatively high in order to save power. Further, when average light intensity is high, the transition output light level may be set relatively low in order to reduce speckle.

In some embodiments, the transition output light level may be determined based on a peak pixel intensity within a line or frame. In other embodiments, the transition output light level may be determined based on a statistical analysis of the image data (e.g., mode, mean, standard deviation, etc.).

In some embodiments, controller 702 receives communications from a host device shown at 704. In some embodiments, the host communications comes from the same host that provides the image data (e.g., image source 102, FIG. 1). The host communication may be used in the determination of the transition output light power level. For example, in some embodiments, the host communication may present a value to be used for the transition output light level. The host may directly determine the amount of power savings or speckle reduction in this manner. Also for example, in some embodiments, the host communication may specify a bias or preference for either power savings or speckle reduction, and controller 702 may bias the determination in response to the host communication.

As shown in FIG. 7, controller 702 drives at least two light sources that emit light of substantially the same wavelength. Controller 702 determines the transition output light level and drives the two light sources using the hybrid laser light source drive as described above. In some embodiments, controller 702 determines transition output light levels for multiple sets of light sources. For example, controller 702 may determine one or more transition output light levels for each of green, red, and/or blue light sources.

In operation, controller 702 drives multiple laser light sources using a hybrid drive. For example, controller 702 drives one of the green laser light sources 220, 222 up to a transition output light level and then drives both of the green laser light sources 220, 222 above the transition output light level. In some embodiments, above the transition output light level, both laser light sources are driven equally, and in other embodiments, both laser light sources are driven unequally.

Image processing component 104 may include any circuitry capable of performing the functions described. For example, in some embodiments, controller 702 includes digital circuits capable of determining a transition output light level, such as multipliers, shifters, and adders. Also for example, in some embodiments, controller 702 may include hardware circuits and may also include a processor that executes instructions.

Figure 8:
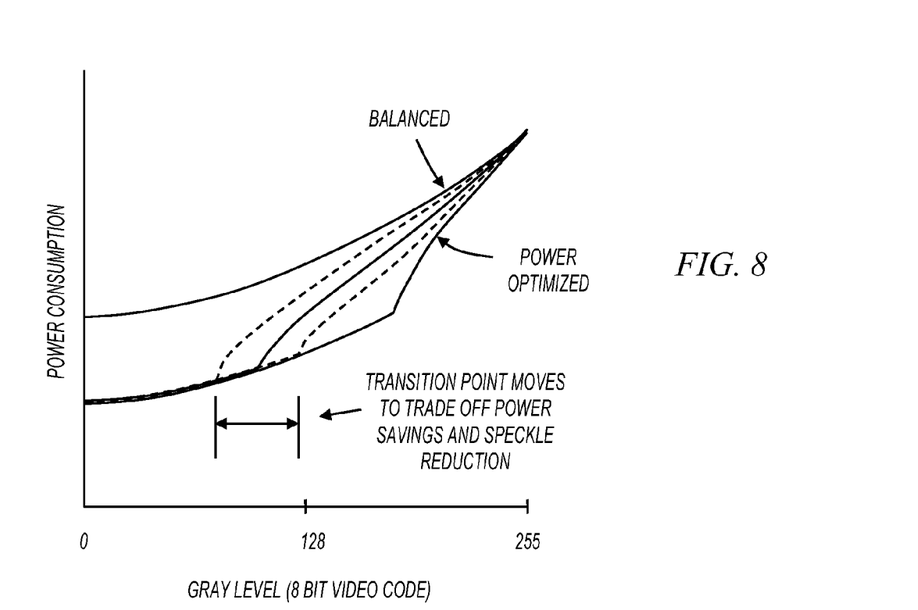
FIG. 8 shows a plot demonstrating a hybrid laser light source drive with a variable transition point.

FIG. 8 shows a plot demonstrating a hybrid laser light source drive with a variable transition point. The plot of FIG. 8 shows the same balanced and power optimized curves shown in FIG. 6; however, the hybrid curve is shown differently. The hybrid curve is shown with different transition output light powers to demonstrate the changes that occur when controller 702 determines different values for the transition output light power. When the transition output light power is increased, power is reduced at the expense of increased speckle, and when the transition output light power is decreased, speckle is reduced at the expense of increased power.

Figure 9:
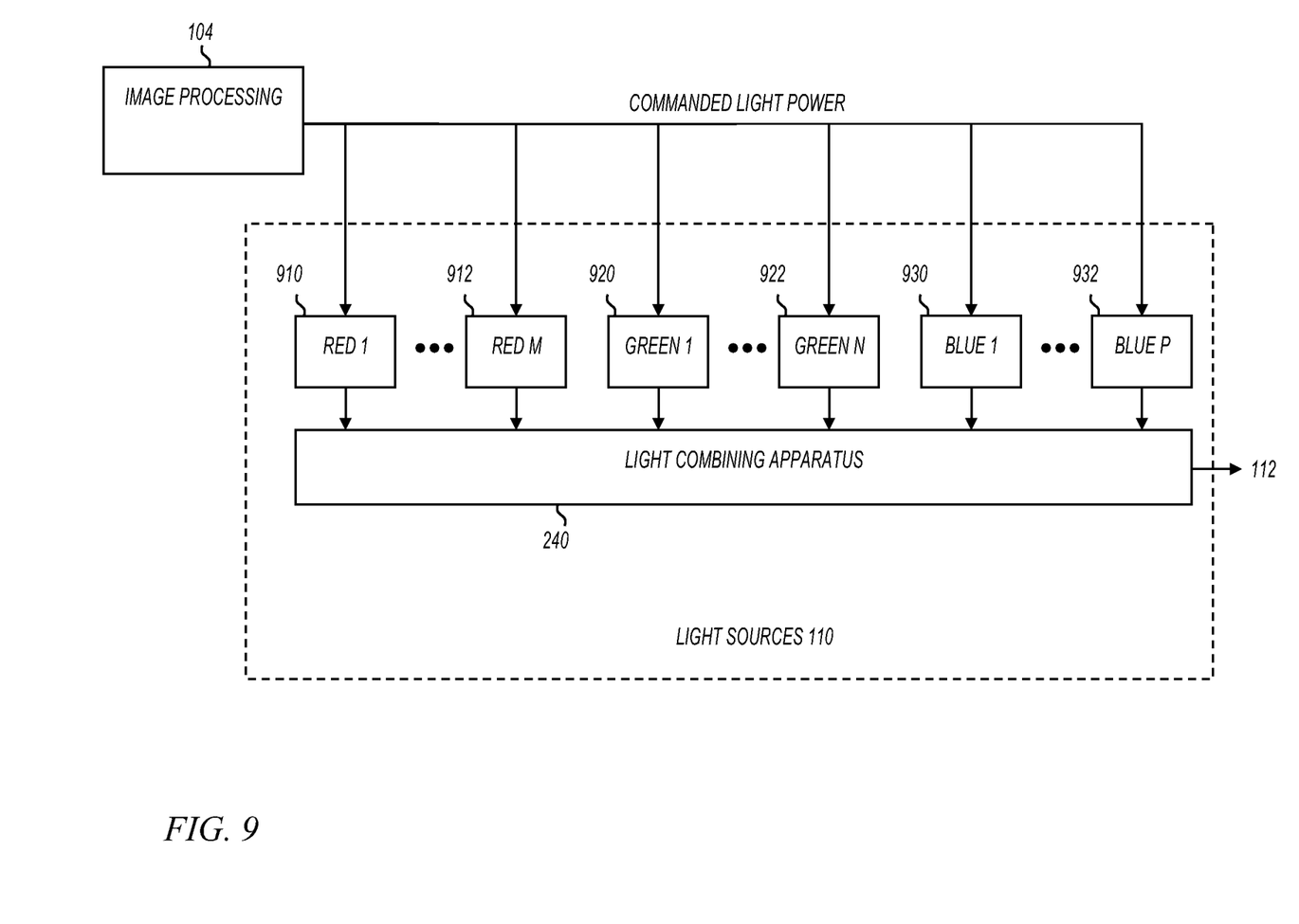
FIG. 9 shows multiple laser light sources that produce light of substantially the same wavelength.

FIG. 9 shows multiple laser light sources that produce light of substantially the same wavelength. FIG. 9 is similar to FIG. 2 with the exception that light sources 110 is explicitly shown with more than two light sources of each color. For example, "M" red light sources are shown starting with red light source 910 and ending with red light source 912; "N" green light sources are shown starting with green light source 920 and ending with green light source 922; and "P" blue light sources are shown starting with blue light source 930 and ending with blue light source 932.

In operation, image processing component 104 may employ a hybrid drive for each color. Further, image processing component 104 may determine more than one transition output light level for each color. In general, image processing component 104 may determine as many as n−1 transition output light levels for a color that includes n light sources.

Figure 10:
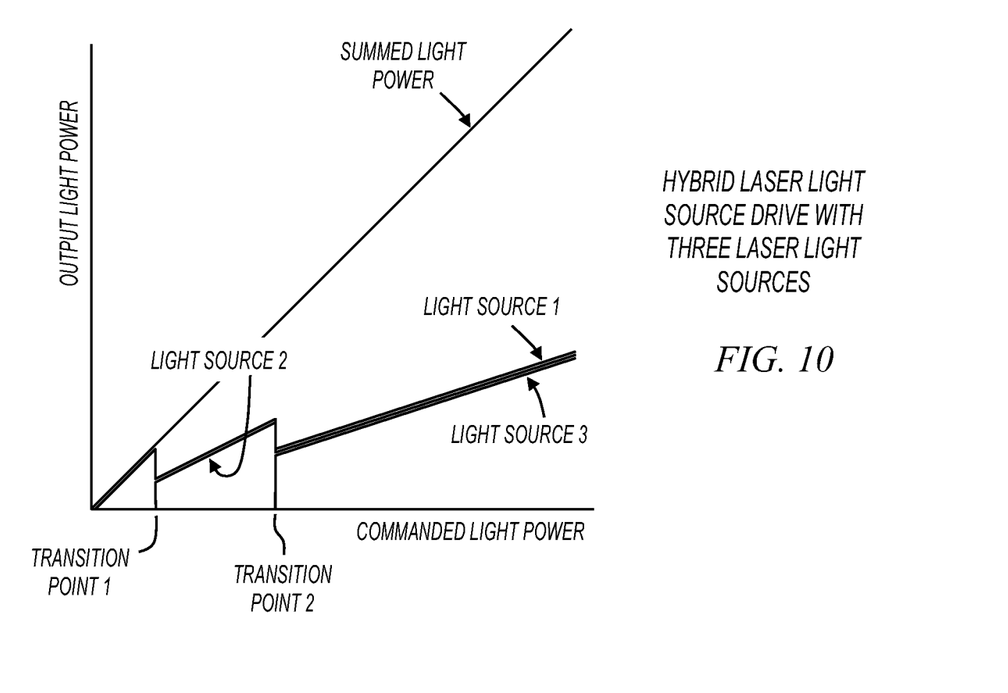
FIG. 10 shows a plot of output light power for hybrid laser light source drive with three light sources.

FIG. 10 shows a plot of output light power for hybrid laser light source drive with three light sources. The example of FIG. 10 corresponds to the operation of light sources 110 (FIG. 9) when three light sources of one color are driven, and image processing component 104 determines two transition output light level. Up to transition point 1, only light source 1 is driven. Between transition point 1 and transition point 2, light source 1 and light source 2 are driven. And above transition point 2, all three light sources are driven. In some embodiments, when multiple light sources are driven, they are driven equally, and in other embodiments, when multiple light sources are driven, they are driven unequally.

Figure 11:
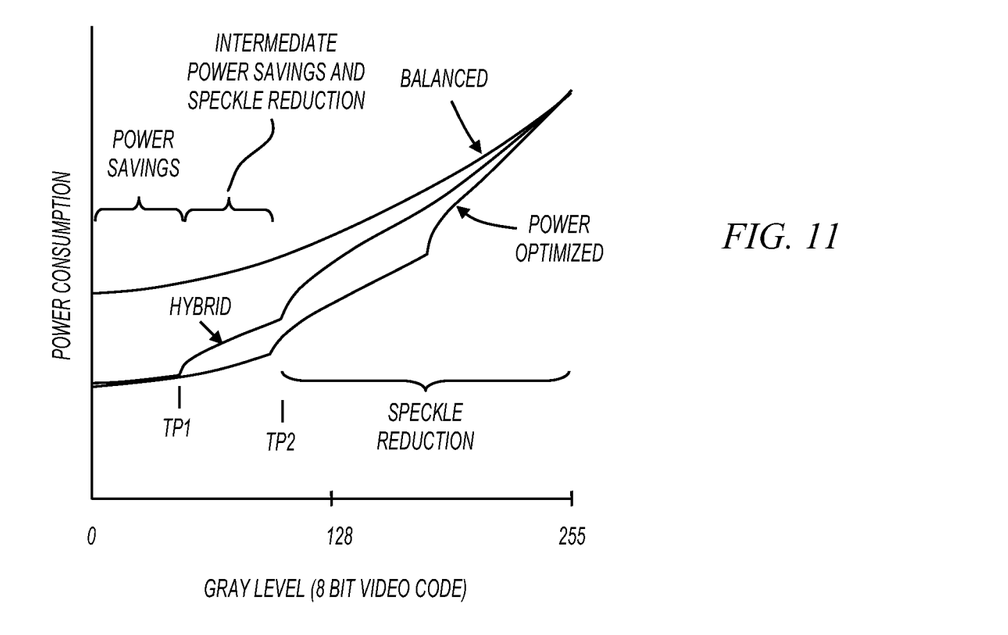
FIG. 11 shows a plot comparing power consumption for balanced, power optimized, and hybrid laser light source drives with three light sources.

FIG. 11 shows a plot comparing power consumption of a frame for balanced, power optimized, and hybrid laser light source drives with three light sources. As shown in FIG. 11, the hybrid drive achieves the same power savings as the power optimized case for commanded drive levels below the first transition point. Between the first and second transition points, intermediate power savings and speckle reduction are achieved, and above the second transition point, speckle is further reduced at the expense of power.

Figure 12:
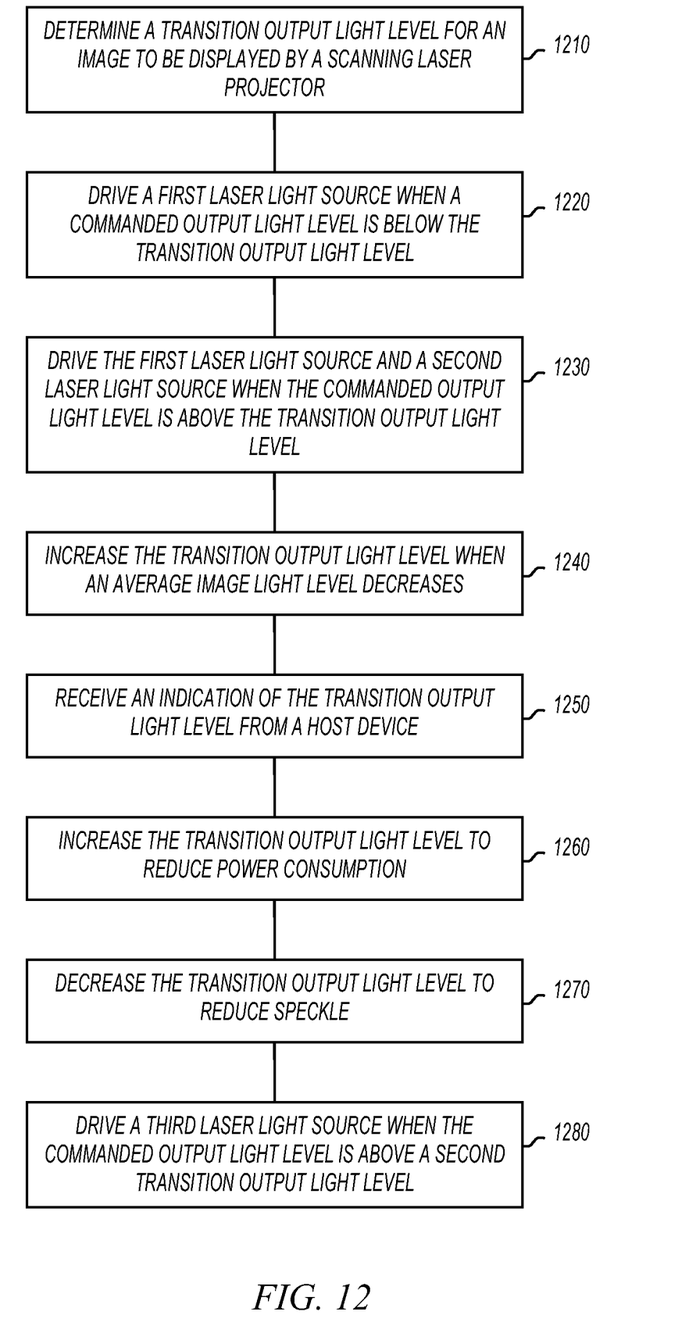
FIG. 12 shows a flowchart of a method for driving two laser light sources of the same wavelength to achieve greater output power.

FIG. 12 shows a flow diagram of methods in accordance with various embodiments of the present invention. In some embodiments, method 1200, or portions thereof, is performed by a scanning projection apparatus, embodiments of which are shown in previous figures. In other embodiments, method 1200 is performed by a series of circuits or an electronic system. Method 1200 is not limited by the particular type of apparatus performing the method. The various actions in method 1200 may be performed in the order presented, or may be performed in a different order. Further, in some embodiments, some actions listed in FIG. 12 are omitted from method 1200.

Method 1200 is shown beginning with block 1210 in which a transition output light level for an image to be displayed by a scanning laser projector is determined. In some embodiments, this corresponds to controller 702 determining a transition output light level based on image contents and/or host communications.

At 1220, a first laser light source is driven when a commanded output light level is below the transition output light level. This corresponds to the hybrid drive case shown in FIG. 5 when the commanded output level is below the transition point.

At 1230, the first laser light source and a second laser light source are driven when the commanded output light level is above the transition output light level. This corresponds to the hybrid drive case shown in FIG. 5 when the commanded output level is above the transition point.

At 1240, the transition output light level is increased when an average image light level decreases. When the average image light level decreases, this corresponds to a smaller number of speckle-causing pixels with high luminance. Since few pixels contribute to speckle, the transition output light level can be increased to reduce power consumption without significantly increasing speckle.

At 1250, an indication of the transition output light level is received from a host device. In some embodiments, this corresponds to image source 102 (FIG. 1) providing host communications (FIG. 7) to controller 702.

At 1260, the transition output light level is increased to reduce power consumption. In some embodiments, this is performed in response to a request from a host device to reduce power consumption. In other embodiments, this is performed by a controller in response to image contents. For example, if an image is dynamic from frame to frame, speckle tends to be less noticeable to the human eye, and the transition output light level may be increased to reduce power consumption at the expense of increased speckle.

At 1270, the transition output light level is decreased to reduce speckle. In some embodiments, this is performed in response to a request from a host device to reduce speckle. In other embodiments, this is performed by a controller in response to image contents. For example, if an image is static from frame to frame, the transition output light level may be decreased to reduce speckle.

At 1280, a third laser light source is driven when a commanded output light level is above a second transition light level. In some embodiments, this corresponds to driving three laser light sources as shown in FIG. 10.

Figure 13:
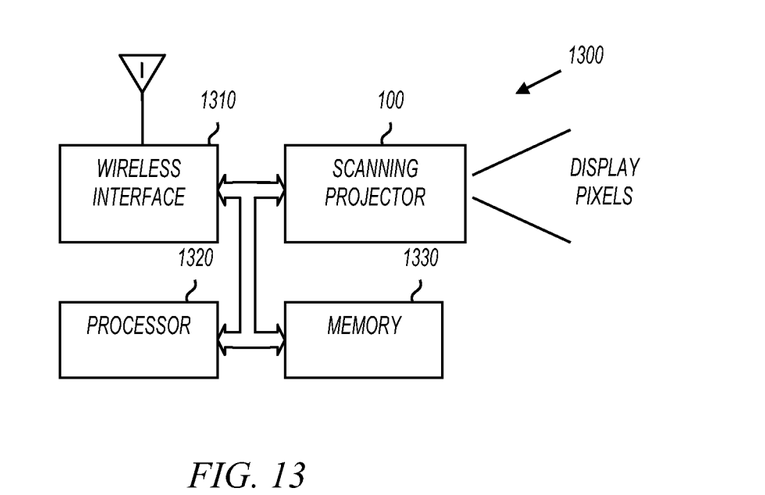
FIG. 13 shows a block diagram of a mobile device in accordance with various embodiments of the present invention.

FIG. 13 shows a block diagram of a mobile device in accordance with various embodiments of the present invention. As shown in FIG. 13, mobile device 1300 includes wireless interface 1310, processor 1320, memory 1330, and scanning projector 100. Scanning projector 100 is described with reference to previous figures. In some embodiments, scanning projector 100 includes multiple laser light sources for producing light at substantially the same wavelength for power savings and speckle reduction as described above.

Scanning projector 100 may receive image data from any image source. For example, in some embodiments, scanning projector 100 includes memory that holds still images. In other embodiments, scanning projector 100 includes memory that includes video images. In still further embodiments, scanning projector 100 displays imagery received from external sources such as connectors, wireless interface 1310, or the like.

In some embodiments, scanning projector 100 receives host communications from one or more of processor 1320 or wireless interface 1310, where the host communications influence the determination of one or more transition output light levels.

Wireless interface 1310 may include any wireless transmission and/or reception capabilities. For example, in some embodiments, wireless interface 1310 includes a network interface card (NIC) capable of communicating over a wireless network. Also for example, in some embodiments, wireless interface 1310 may include cellular telephone capabilities. In still further embodiments, wireless interface 1310 may include a global positioning system (GPS) receiver. One skilled in the art will understand that wireless interface 1310 may include any type of wireless communications capability without departing from the scope of the present invention.

Processor 1320 may be any type of processor capable of communicating with the various components in mobile device 1300. For example, processor 1320 may be an embedded processor available from application specific integrated circuit (ASIC) vendors, or may be a commercially available microprocessor. In some embodiments, processor 1320 provides image or video data to scanning projector 100. The image or video data may be retrieved from wireless interface 1310 or may be derived from data retrieved from wireless interface 1310. For example, through processor 1320, scanning projector 100 may display images or video received directly from wireless interface 1310. Also for example, processor 1320 may provide overlays to add to images and/or video received from wireless interface 1310, or may alter stored imagery based on data received from wireless interface 1310 (e.g., modifying a map display in GPS embodiments in which wireless interface 1310 provides location coordinates).

Figure 14:
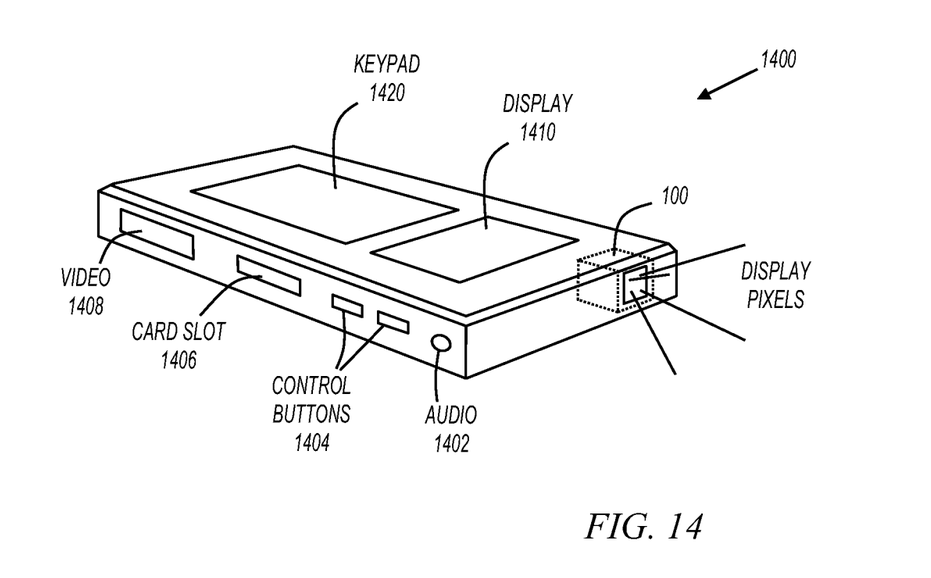
FIG. 14 shows a mobile device in accordance with various embodiments of the present invention.

FIG. 14 shows a mobile device in accordance with various embodiments of the present invention. Mobile device 1400 may be a hand held projection device with or without communications ability. For example, in some embodiments, mobile device 1400 may be a handheld projector with little or no other capabilities. Also for example, in some embodiments, mobile device 1400 may be a device usable for communications, including for example, a cellular phone, a smart phone, a personal digital assistant (PDA), a tablet computer, a global positioning system (GPS) receiver, or the like. Further, mobile device 1400 may be connected to a larger network via a wireless (e.g., WiMax) or cellular connection, or this device can accept data messages or video content via an unregulated spectrum (e.g., WiFi) connection.

Mobile device 1400 includes scanning projector 100 to create an image from display pixels as shown in FIG. 14. Mobile device 1400 also includes many other types of circuitry; however, they are intentionally omitted from FIG. 14 for clarity.

Mobile device 1400 includes display 1410, keypad 1420, audio port 1402, control buttons 1404, card slot 1406, and audio/video (A/V) port 1408. None of these elements are essential. For example, mobile device 1400 may only include scanning projector 100 without any of display 1410, keypad 1420, audio port 1402, control buttons 1404, card slot 1406, or A/V port 1408. Some embodiments include a subset of these elements. For example, an accessory projector product may include scanning projector 100, control buttons 1404 and A/V port 1408.

Display 1410 may be any type of display. For example, in some embodiments, display 1410 includes a liquid crystal display (LCD) screen. Display 1410 may always display the same content as that projected or different content. For example, an accessory projector product may always display the same content, whereas a mobile phone embodiment may project one type of content while displaying different content on display 1410. Keypad 1420 may be a phone keypad or any other type of keypad.

A/V port 1408 accepts and/or transmits video and/or audio signals. For example, A/V port 1408 may be a digital port such as an HDMI port that accepts a cable suitable to carry digital audio and video data. Further, A/V port 1408 may include RCA jacks to accept composite inputs. Still further, A/V port 1408 may include a VGA connector to accept analog video signals. In some embodiments, mobile device 1400 may be tethered to an external signal source through A/V port 1408, and mobile device 1400 may project content accepted through A/V port 1408. In other embodiments, mobile device 1400 may be an originator of content, and A/V port 1408 is used to transmit content to a different device.

Audio port 1402 provides audio signals. For example, in some embodiments, mobile device 1400 is a media player that can store and play audio and video. In these embodiments, the video may be projected and the audio may be output at audio port 1402. In other embodiments, mobile device 1400 may be an accessory projector that receives audio and video at A/V port 1408. In these embodiments, mobile device 1400 may project the video content, and output the audio content at audio port 1402.

Mobile device 1400 also includes card slot 1406. In some embodiments, a memory card inserted in card slot 1406 may provide a source for audio to be output at audio port 1402 and/or video data to be projected. Card slot 1406 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 15:
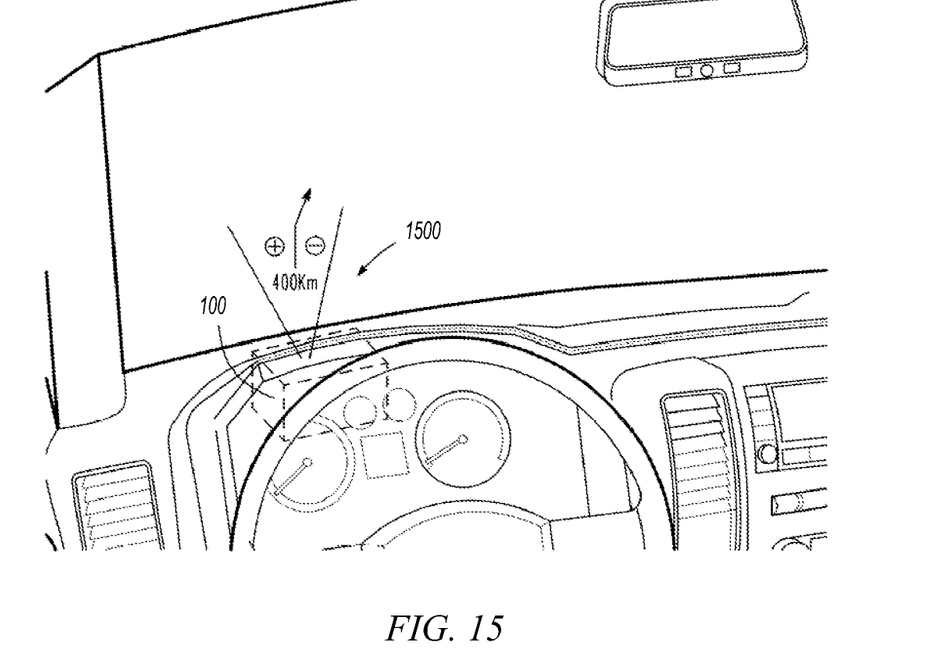
FIG. 15 shows a head-up display system in accordance with various embodiments of the invention.

FIG. 15 shows a head-up display system in accordance with various embodiments of the invention. Projector 100 is shown mounted in a vehicle dash to project the head-up display at 1500. Although an automotive head-up display is shown in FIG. 15, this is not a limitation of the present invention. For example, various embodiments of the invention include head-up displays in avionics application, air traffic control applications, and other applications.

Figure 16:
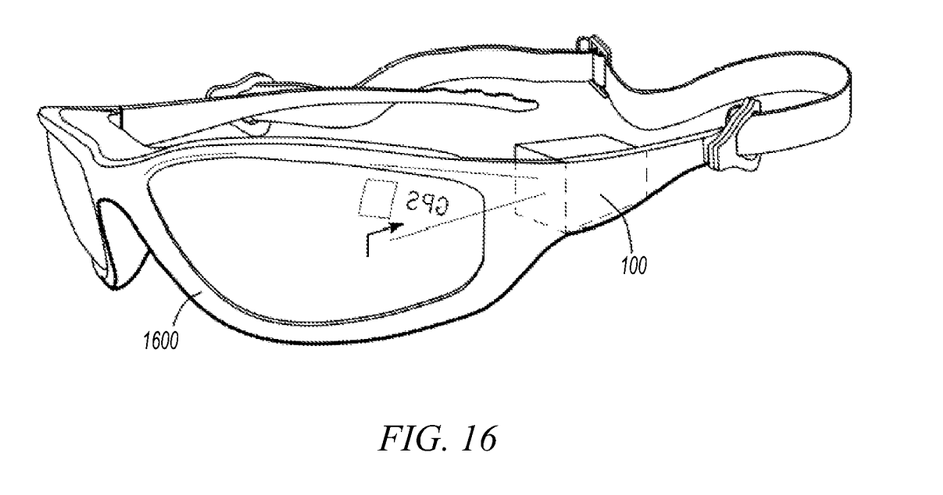
FIG. 16 shows eyewear in accordance with various embodiments of the invention.

FIG. 16 shows eyewear in accordance with various embodiments of the invention. Eyewear 1600 includes projector 100 to project a display in the eyewear's field of view. In some embodiments, eyewear 1600 is see-through and in other embodiments, eyewear 1600 is opaque. For example, eyewear may be used in an augmented reality application in which a wearer can see the display from projector 100 overlaid on the physical world. Also for example, eyewear may be used in a virtual reality application, in which a wearer's entire view is generated by projector 100. Although only one projector 100 is shown in FIG. 16, this is not a limitation of the present invention. For example, in some embodiments, eyewear 1600 includes two projectors; one for each eye.

Figure 17:
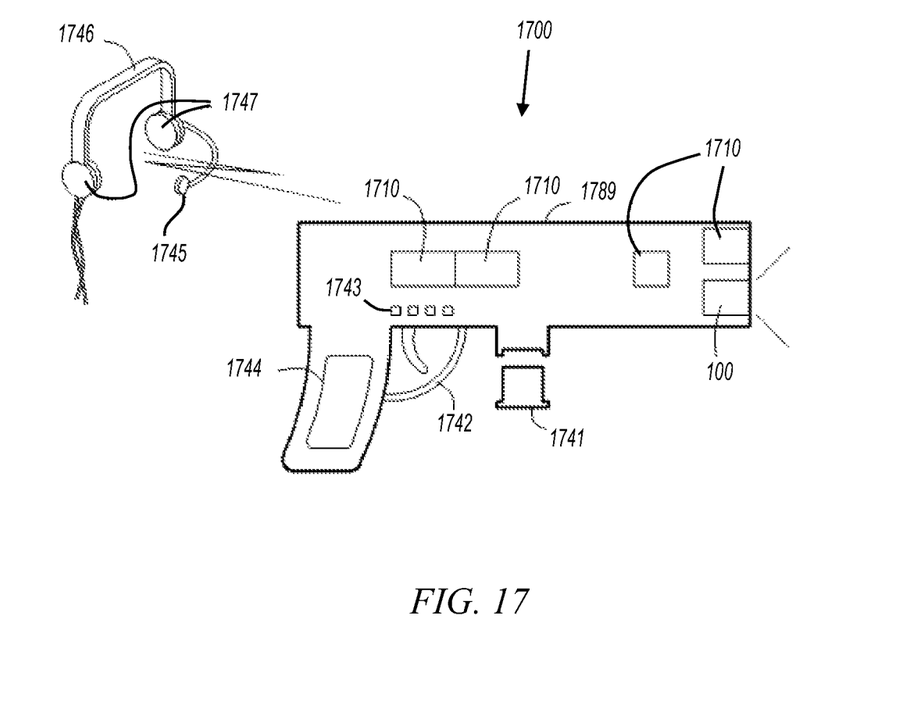
FIG. 17 shows a gaming apparatus in accordance with various embodiments of the present invention.

FIG. 17 shows a gaming apparatus in accordance with various embodiments of the present invention. Gaming apparatus 1700 allows a user or users to observe and interact with a gaming environment. In some embodiments, the game is navigated based on the motion, position or orientation of gaming apparatus 1700, an apparatus that includes projection apparatus 100. Other control interfaces, such as manually-operated buttons, foot pedals, or verbal commands, may also contribute to navigation around, or interaction with the gaming environment. For example, in some embodiments, trigger 1742 contributes to the illusion that the user or users are in a first person perspective video game environment, commonly known as a "first person shooter game." Because the projected display can be controlled by the gaming application in combination with the user's movement, gaming apparatus 1700 creates a highly believable or "immersive" environment for these users.

Many other first person perspective simulations can also be created by gaming apparatus 1700, for such activities as 3D seismic geo-prospecting, spacewalk planning, jungle canopy exploration, automobile safety instruction, medical education, etc. Tactile interface 1744 may provide a variety of output signals, such as recoil, vibration, shake, rumble, etc. Tactile interface 1744 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1700 may also include audio output devices, such as integrated audio speakers, remote speakers, or headphones. These sorts of audio output devices may be connected to gaming apparatus 1700 with wires or through a wireless technology. For example, wireless headphones 1746 provide the user with sound effects via a Bluetooth connection, although any sort of similar wireless technology could be substituted freely. In some embodiments, wireless headphones 1746 may include microphone 1745 or binaural microphone 1747, to allow multiple users, instructors, or observers to communicate. Binaural microphone 1747 typically includes microphones on each ear piece, to capture sounds modified by the user's head shadow. This feature may be used for binaural hearing and sound localization by other simulation participants.

Gaming apparatus 1700 may include any number of sensors 1710 that measure distance, ambient brightness, motion, position, orientation, and the like. For example, gaming apparatus 1700 may detect absolute heading with a digital compass, and detect relative motion with an x-y-z gyroscope or accelerometer. In some embodiments, gaming apparatus 1700 also includes a second accelerometer or gyroscope to detect the relative orientation of the device, or its rapid acceleration or deceleration. In other embodiments, gaming apparatus 1700 may include a Global Positioning Satellite (GPS) sensor, to detect absolute position as the user travels in terrestrial space.

Gaming apparatus 1700 may include battery 1741 and/or diagnostic lights 1743. For example, battery 1741 may be a rechargeable battery, and diagnostic lights 1743 could indicate the current charge of the battery. In another example, battery 1741 may be a removable battery clip, and gaming apparatus 1700 may have an additional battery, electrical capacitor or super-capacitor to allow for continued operation of the apparatus while the discharged battery is replaced with a charged battery. In other embodiments, diagnostic lights 1743 can inform the user or a service technician about the status of the electronic components included within or connected to this device. For example, diagnostic lights 1743 may indicate the strength of a received wireless signal, or the presence or absence of a memory card. Diagnostic lights 1743 could also be replaced by any small screen, such as an organic light emitting diode or liquid crystal display screen. Such lights or screens could be on the exterior surface of gaming apparatus 1700, or below the surface, if the shell for this apparatus is translucent or transparent.

Other components of gaming apparatus 1700 may be removable, detachable or separable from this device. For example, the projection apparatus 100 may be detachable or separable from gaming housing 1749. In some embodiments, the subcomponents of the projection apparatus 100 may be detachable or separable from gaming housing 1749, and still function.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector comprising:
    a scanning mirror to reflect a light beam in a raster pattern to display an image;
    a plurality of laser light sources that emit light at substantially the same wavelength to form the light beam; and
    a controller coupled to receive a commanded light output level and to drive the plurality of laser light sources, the controller configured to drive only a first of the plurality of laser light sources when the commanded light output level is below a transition output light level, and to drive the first and a second of the plurality of laser light sources when the commanded light output level is above the transition output light level.

2. The scanning laser projector of claim 1 wherein the transition output light level corresponds to substantially one half of a maximum light output available from the first of the plurality of laser light sources.

3. The scanning laser projector of claim 1 wherein the controller is configured to adaptively modify the transition output light level.

4. The scanning laser projector of claim 3 wherein the controller is configured to set the transition output light level based on content of the image.

5. The scanning laser projector of claim 4 wherein the controller is configured to set the transition output light level based on an average output light level across the image.

6. The scanning laser projector of claim 4 wherein the controller is configured to set the transition output light level based on whether the image is static or dynamic.

7. The scanning laser projector of claim 1 wherein the controller is coupled to receive data representing the transition output light level from a host device.

8. The scanning laser projector of claim 1 wherein the plurality of laser light sources comprises three laser light sources.

9. The scanning laser projector of claim 8 wherein the controller is configured to drive all three laser light sources when receiving a commanded light output level above a second transition output light level.

10. The scanning laser projector of claim 1 further comprising a second plurality of laser light sources that emit light at a second wavelength, wherein the controller is further configured to drive only a first of the second plurality of laser light sources when the commanded light output level at the second wavelength is below a second transition output light level, and to drive the first and a second of the second plurality of laser light sources when the commanded light output level is above the second transition output light level.

11. A mobile device comprising:
    an image source;
    a scanning laser projector to receive image data from the image source, the scanning laser projector including a plurality of laser light sources that emit light at substantially the same wavelength, and a controller coupled to drive the plurality of laser light sources, the controller configured to drive only a first of the plurality of laser light sources when a current pixel in the image data is below a transition output light level, and to drive the first and a second of the plurality of laser light sources when the current pixel is above the transition output light level.

12. The mobile device of claim 11 wherein the mobile device comprises a handheld gaming component.

13. The mobile device of claim 11 wherein the mobile device comprises a smartphone.

14. The mobile device of claim 11 wherein the mobile device comprises a tablet computer.

15. A method comprising:
    determining a transition output light level for an image to be displayed by a scanning laser projector;
    driving a first laser light source when a commanded output light level is below the transition output light level; and
    driving the first laser light source and a second laser light source when the commanded output light level is above the transition light level;
    wherein the first and second laser light sources emit light at substantially the same wavelength.

16. The method of claim 15 wherein determining a transition output light level comprises increasing the transition output light level when an average image light level decreases.

17. The method of claim 15 wherein determining a transition output light level comprises receiving an indication from a host device that sources the contents of the image.

18. The method of claim 15 further comprising driving the first and second laser light sources and a third laser light source when the commanded output light level is above a second transition output light level.

19. The method of claim 15 further comprising increasing the transition output light level to reduce power consumption.

20. The method of claim 15 further comprising decreasing the transition output light level to reduce speckle.

* * * * *